United States Patent
Chu et al.

(10) Patent No.: US 10,216,535 B2
(45) Date of Patent: Feb. 26, 2019

(54) EFFICIENT MAC ADDRESS STORAGE FOR VIRTUAL MACHINE APPLICATIONS

(71) Applicant: MediaTek Inc., Hsinchu (TW)

(72) Inventors: Chun-Yuan Chu, Taipei (TW); Xiaorong Qu, Cupertino, CA (US); Hong-Ching Chen, Kaohsiung (TW); Kuo-Cheng Lu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 324 days.

(21) Appl. No.: 14/987,453

(22) Filed: Jan. 4, 2016

(65) Prior Publication Data

US 2016/0124863 A1    May 5, 2016

Related U.S. Application Data

(60) Provisional application No. 62/101,517, filed on Jan. 9, 2015.

(51) Int. Cl.
| | |
|---|---|
| *G06F 3/06* | (2006.01) |
| *G06F 12/10* | (2016.01) |
| *G06F 9/455* | (2018.01) |
| *H04L 12/741* | (2013.01) |
| *H04L 29/12* | (2006.01) |
| *G06F 12/109* | (2016.01) |
| *H04L 29/08* | (2006.01) |
| *H04L 12/713* | (2013.01) |
| *H04L 12/721* | (2013.01) |

(52) U.S. Cl.
CPC .......... *G06F 9/45558* (2013.01); *G06F 3/065* (2013.01); *G06F 3/067* (2013.01); *G06F 3/0619* (2013.01); *G06F 12/109* (2013.01); *H04L 45/586* (2013.01); *H04L 45/745* (2013.01); *H04L 61/6004* (2013.01); *H04L 67/10* (2013.01); *G06F 2009/45595* (2013.01); *G06F 2212/657* (2013.01); *H04L 45/66* (2013.01); *H04L 61/6022* (2013.01)

(58) Field of Classification Search
CPC ........ G06F 3/0619; G06F 3/065; G06F 3/067; G06F 9/45558; G06F 12/109; G06F 2009/45595; G06F 2212/657; H04L 45/586; H04L 45/66; H04L 45/745; H04L 61/6004; H04L 61/6022
See application file for complete search history.

(56) References Cited

FOREIGN PATENT DOCUMENTS

WO    WO-2014032623 A1 *  3/2014   .......... H04L 12/4641

* cited by examiner

*Primary Examiner* — Aracelis Ruiz
(74) *Attorney, Agent, or Firm* — Han IP PLLC; Andy M. Han (57) ABSTRACT

Examples of efficient MAC address storage are described, including methods and an apparatus. A method may involve obtaining a plurality of identifications associated with one or more applications executed on a computing apparatus, with each identification of the plurality of identifications different from one another. The method may also involve storing an identification entry representative of the plurality of identifications associated with the one or more applications. The identification entry may require an amount of memory space for storage less than an amount of memory space required to store the plurality of identifications associated with the one or more applications. The plurality of identifications may be a plurality of MAC addresses. The one or more applications may be one or more virtual machines.

10 Claims, 8 Drawing Sheets

EFFICIENT MAC ADDRESS STORAGE FOR VIRTUAL MACHINE APPLICATIONS

CROSS REFERENCE TO RELATED PATENT APPLICATION

The present disclosure claims the priority benefit of U.S. Provisional Patent Application No. 62/101,517, filed on 9 Jan. 2015, which is incorporated by reference in its entirety.

TECHNICAL FIELD

The present disclosure is generally related to computer networking and, more particularly, to efficient media access control (MAC) address storage for virtual machine applications.

BACKGROUND

Unless otherwise indicated herein, approaches described in this section are not prior art to the claims listed below and are not admitted to be prior art by inclusion in this section.

Server virtualization is a popular technique in data centers. Specifically, images of multiple operation systems (OS) are transparently executed in the same physical server. These OS images are referred to as virtual machines (VMs). The VMs share the same physical server and physical input/output (I/O) ports of the server. To distinguish the VMs, different MAC addresses are assigned to the VMs in the same sever. That is, each VM has a MAC address different from the MAC addresses of other VMs executed on the same server. Accordingly, a network switch needs to maintain the MAC addresses of all VMs for communication with each other. As a result, there is a huge requirement of memory to store the MAC addresses of all the VMs in the server for VM applications.

SUMMARY

The following summary is illustrative only and is not intended to be limiting in any way. That is, the following summary is provided to introduce concepts, highlights, benefits and advantages of the novel and non-obvious techniques described herein. Select, not all, implementations are further described below in the detailed description. Thus, the following summary is not intended to identify essential features of the claimed subject matter, nor is it intended for use in determining the scope of the claimed subject matter.

Implementations in accordance with the present disclosure provide an efficient way to store MAC addresses of VM applications executed on the same physical server, thus advantageously reducing memory requirement for storage of MAC addresses of those VM applications. Specifically, implementations in accordance with the present disclosure leverage a characteristic of virtual machines executed on the same physical server to reduce the memory requirement for storage of MAC addresses for those VM applications.

In one example implementation, a method may involve obtaining a plurality of identifications associated with one or more applications executed on a computing apparatus, with each identification of the plurality of identifications different from one another. The method may also involve storing an identification entry representative of the plurality of identifications associated with the one or more applications.

In another example implementation, a method may involve determining at least one common property each having a respective value commonly shared by a plurality of addresses associated with one or more virtual machines executed on a computing apparatus, with each address of the plurality of addresses different from one another. The method may also involve generating at least one first field each containing the respective value of a corresponding property of the at least one common property. The method may further involve generating at least one second field each containing a respective value distinguishably identifying each virtual machine of the one or more virtual machines. The method may additionally involve storing the at least one first field and the at least one second field as an address entry representative of the plurality of addresses associated with the one or more virtual machines.

In yet another example implementation, an apparatus may include one or more input ports configured to receive incoming data packets, one or more output ports configured to transmit outgoing data packets, a memory and a processor communicatively coupled to the one or more input ports, the one or more output ports and the memory. The processor may be configured to perform a number of operations. The processor may determine, based on a plurality of addresses for which the incoming data packets are destined, at least one common property each having a respective value commonly shared by the plurality of addresses associated with one or more virtual machines executed on a computing apparatus, with each address of the plurality of addresses different from one another. The processor may also generate at least one first field each containing the respective value of a corresponding property of the at least one common property. The processor may further generate at least one second field each containing a respective value distinguishably identifying each virtual machine of the one or more virtual machines. The processor may store the at least one first field and the at least one second field as an address entry representative of the plurality of addresses associated with the one or more virtual machines.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED EMBODIMENTS

Overview

Figure 8:
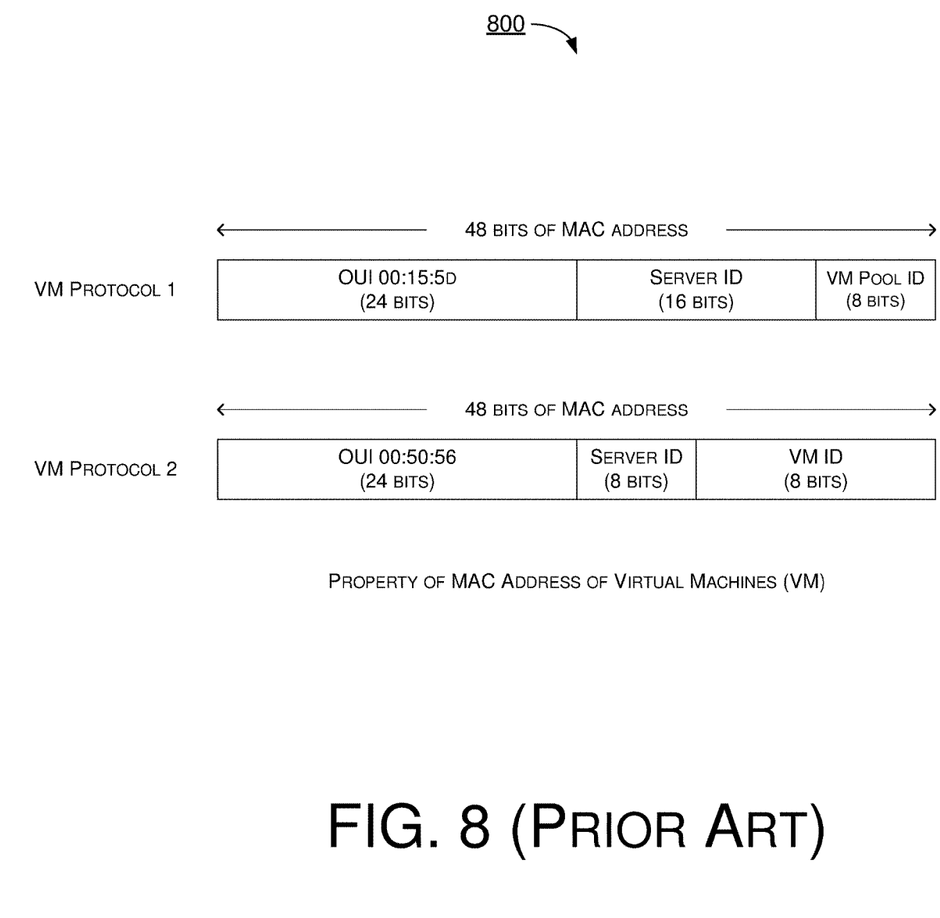
FIG. 8 is a diagram of an example of MAC addresses of two different VM protocols showing a characteristic of MAC addresses of virtual machines.

In general, for a specific VM protocol, the organizationally unique identifier (OUI) field is fixed. Moreover, for a specific physical server, the server identification (ID) is also fixed. Hence, for multiple VMs of a specific VM protocol and executed on a specific physical server, it is the least significant bit(s) (LSB) portion of the VM MAC address that can be used to distinguish the MAC address of one VM from the MAC addresses of the other VMs. FIG. 8 illustrates an example 800 of the MAC addresses of two different VM protocols showing this characteristic common to the MAC addresses of VMs.

Implementations in accordance with the present disclosure leverage this characteristic to reduce the memory requirement for storage of MAC addresses for VM applications. The bit width of the common VM MAC address bits is usually much more than the distinguishable bits (e.g., the LSB bits) of a VM MAC address. For multiple VMs in a same physical server, the server may store one copy of the common VM MAC bits in accordance with implementations of the present disclosure and, advantageously, the memory requirement can be reduced significantly.

For instance, under a conventional approach a server having 32 VMs executed thereon would need 1536 bits of memory (=48 bits for the MAC address of each VM×32 VMs) for storage of the MAC addresses of the 32 VMs. In contrast, a server implementing techniques in accordance with the present disclosure may store the same information using merely 544 bits of memory (=32 bits for identification of the common OUI and common server+16 least significant bits of the MAC address of each VM×32 VMs). In this example, the memory requirement is reduced from 1536 bits to 544 bits, or a reduction of 64.58%.

In a router, the host IP lookup finds the MAC address and the output port of the host machine. If multiple host machines are the VMs in the same physical server, then the output port for these multiple host machines/VMs would be the same. Preferably, these host machines can share the common VM MAC bits.

Figure 1:
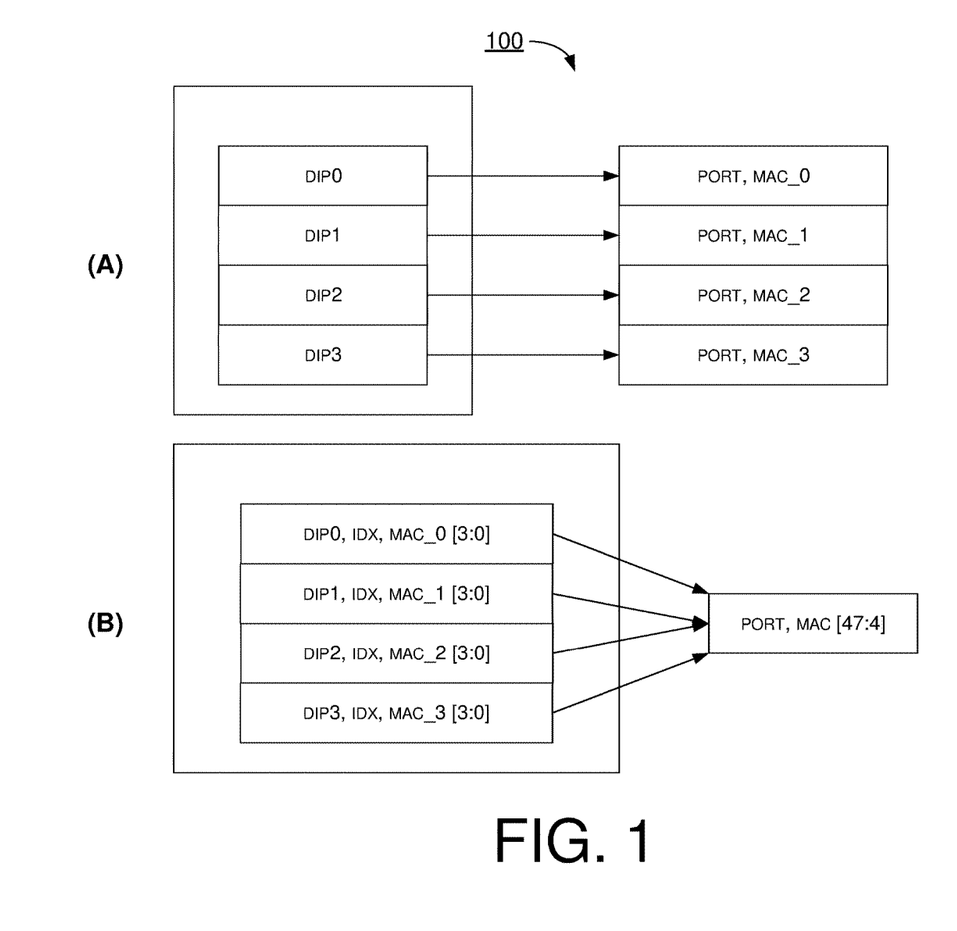
FIG. 1 is a diagram of an example scenario comparing a conventional approach and a novel approach in accordance with an implementation of the present disclosure.

FIG. 1 illustrates an example scenario 100 that compares a conventional approach and a novel approach in accordance with an implementation of the present disclosure. Scenario 100 may take place in a data memory such as a data static random-access memory (SRAM), or another type of memory, of a network node such as, for example and not limited to, a switch, router or gateway. In the example shown in FIG. 1, there are four VMs that share the same output port and common 44 bits of most significant bits (MSB) of the respective MAC addresses. Part (A) of FIG. 1 shows a conventional approach under which each host entry requires its own memory to store information of the output port and the respective MAC address. Part (B) of FIG. 1 shows a proposed approach in accordance with the present disclosure. Under the proposed approach, each host entry may contain a respective destination IP (DIP), the least significant bits of the respective MAC address, and an index to the common output port and common 44 bits of the MAC address. In this example, there are four distinguishable least significant bits in the MAC address and, thus, there may be a maximum of 16 host VMs having the common output port and 44 most significant bits can share the information. Those skilled in the art would understand that the example shown in FIG. 1 is for illustrative purpose to aid better appreciation of the present disclosure without limiting the scope of the present disclosure.

Figure 2:
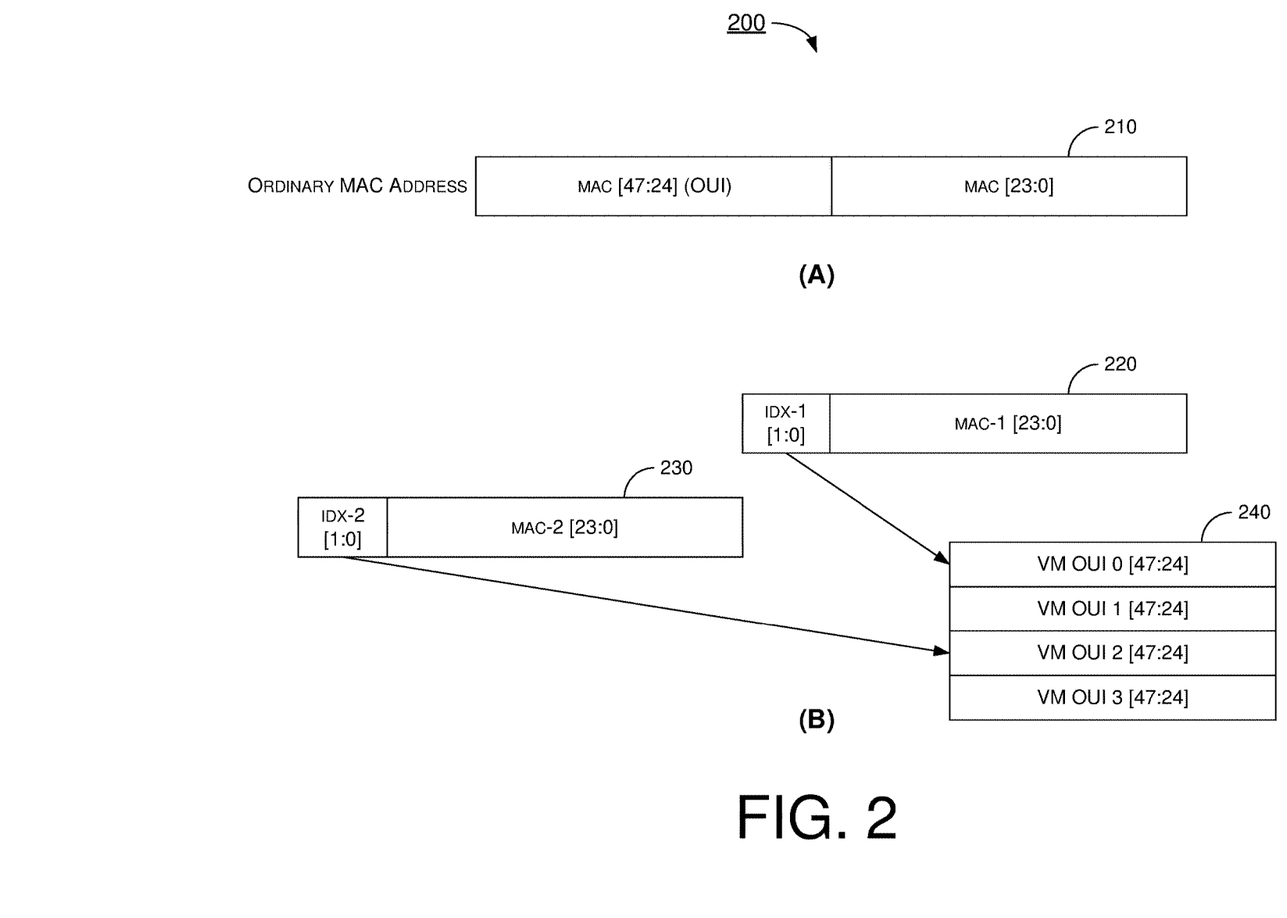
FIG. 2 is a diagram of an example scenario of efficient MAC address storage in accordance with an implementation of the present disclosure.

FIG. 2 illustrates an example scenario 200 of efficient MAC address storage in accordance with an implementation of the present disclosure. Scenario 200 may take place in a data memory such as a data SRAM (or another type of memory) or a search SRAM (or another type of memory) of a network node such as, for example and not limited to, a switch, router or gateway. For a specific VM protocol, the value in the OUI field remains unchanged and is fixed. A network node (e.g., a switch, router or gateway) in accordance with the present disclosure may use a mapping table to store the OUI of each supported VM protocol. The network node may need 48 bits to store an ordinary MAC address, including 24 buts for the OUI. Part (A) of FIG. 2 shows an ordinary MAC address 210 having 48 bits. By combining with a mapping table, the memory required to store the MAC address of a VM by the network node is reduced to 26 bits. Part (B) of FIG. 2 shows two MAC address entries 220 and 230 stored by a network node. Each of MAC address entries 220 and 230 includes an index pointing to a corresponding entry in a mapping table 240 storing the 24-bit OUI of the respective VM. The example shown in FIG. 2 can support up to four VM protocols. A different number of VM protocols may be supported based on FIG. 2 and such variations are also within the scope of the present disclosure.

Figure 3:
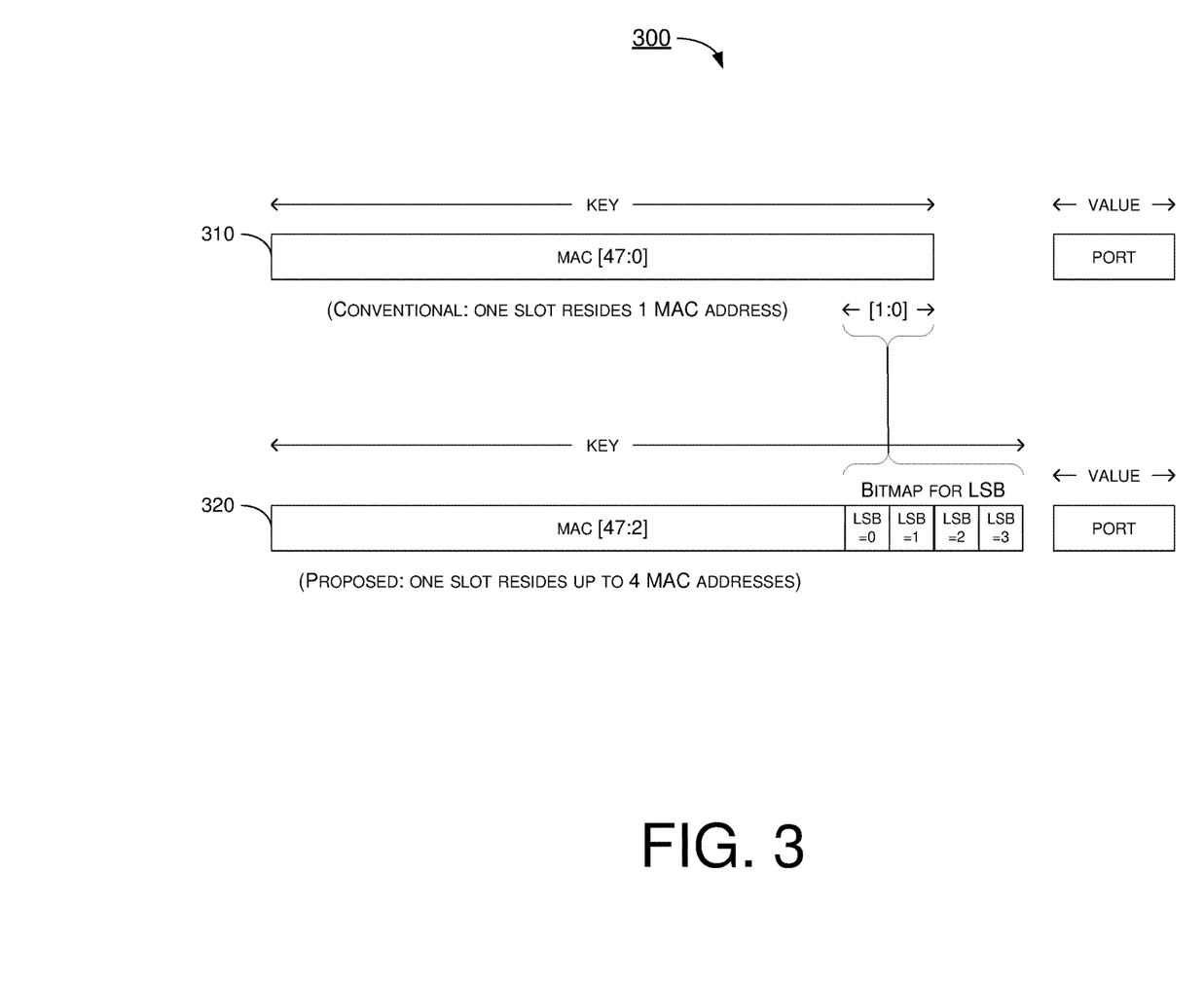
FIG. 3 is a diagram of an example scenario of efficient MAC address storage in accordance with an implementation of the present disclosure.

FIG. 3 illustrates an example scenario 300 of efficient MAC address storage in accordance with an implementation of the present disclosure. Scenario 300 may take place in a search SRAM (or another type of memory) of a network node such as, for example and not limited to, a switch, router or gateway. Given that multiple VMs in the same physical server may share common most significant bits of the MAC address as well as port information, a network node (e.g., a switch, router or gateway) in accordance with the present disclosure may use one single memory entry to store the MAC addresses and output port of the multiple VMs. In the example shown in FIG. 3, the two least significant bits of a MAC address 310 is transformed into a converted MAC address entry 320 with a bit map having four bits. Each bit of the bit map may indicate whether the two least significant bits as 00, 01, 10 and 11 is a valid MAC or not. An example implementation is shown in FIG. 4.

Figure 4:
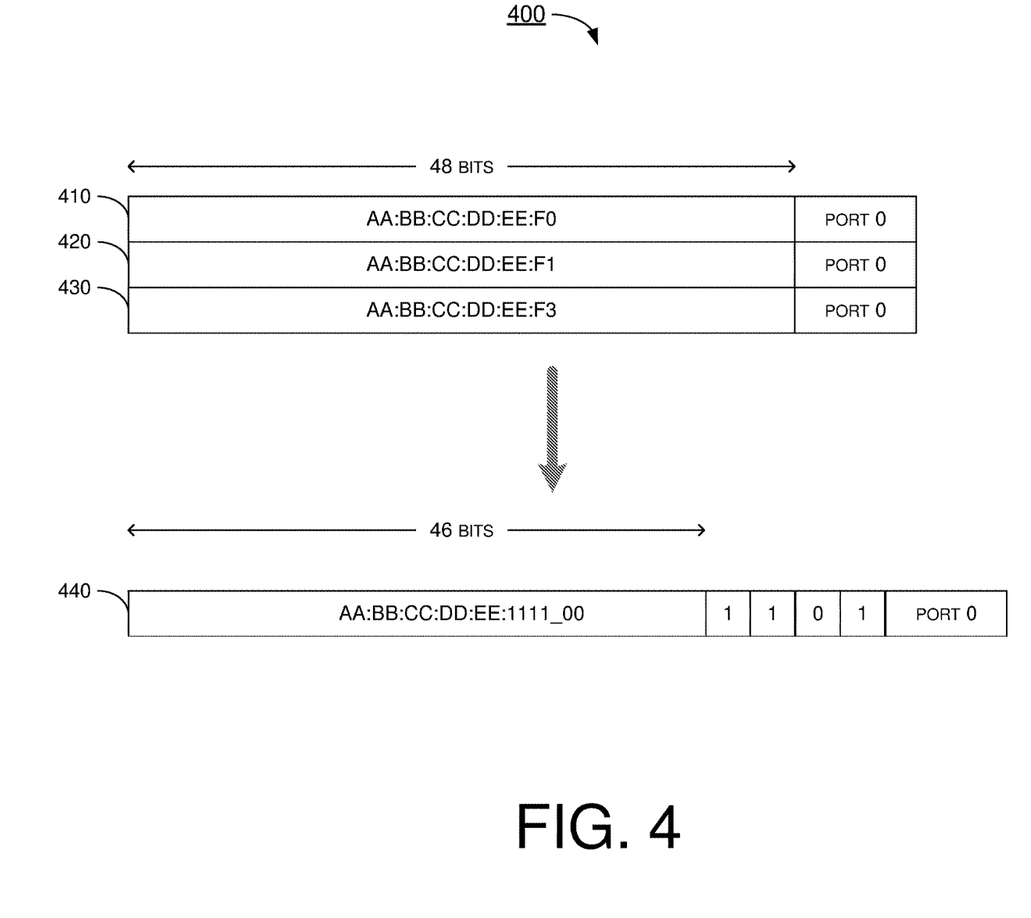
FIG. 4 is a diagram of an example scenario of mapping multiple MAC addresses to one single MAC address entry for storage in accordance with an implementation of the present disclosure.

FIG. 4 illustrates an example scenario of mapping multiple MAC addresses to one single MAC address entry for storage in accordance with an implementation of the present disclosure. Scenario 400 may take place in a search SRAM (or another type of memory) of a network node such as, for example and not limited to, a switch, router or gateway. In the example shown in FIG. 4, three example MAC addresses 410, 420 and 430, namely (AA:BB:CC:DD:EE:F0), (AA:BB:CC:DD:EE:F1) and (AA:BB:CC:DD:EE:F3), are three valid MAC address of three VMs in the same physical server. In this example, the three VMs also share the same common output port, port 0. Under the conventional approach, the server may require three entries in the memory to store these three different MAC addresses. The proposed technique in accordance with the present disclosure may convert the three MAC entries into one entry 440 and, thus, result in saving in memory requirement. Given that the two least significant bits of MAC addresses 410, 420 and 430 are "00", "01" and "11", the bits 0, 1, and 3 of the bit map are correspondingly set to 1 to indicate that a MAC address having "00", "01" or "11" in its two least significant bits is a valid MAC address. On the other hand, given that none of the MAC addresses 410, 420 and 430 has "10" in the two least significant bits, the bit 2 of the bit map is set to 0 to indicate that there is no MAC address having "10" among MAC addresses 410, 420 and 430 in its two least significant bits. Those skilled in the art would understand that the example shown in FIG. 4 is for illustrative purpose to aid better appreciation of the present disclosure without limiting the scope of the present disclosure, and any variations from the example shown herein are also within the scope of the present disclosure. For instance, the design may be extended to use the three least significant bits, and correspondingly the bit map would have eight bits.

Example Implementations

Figure 5:
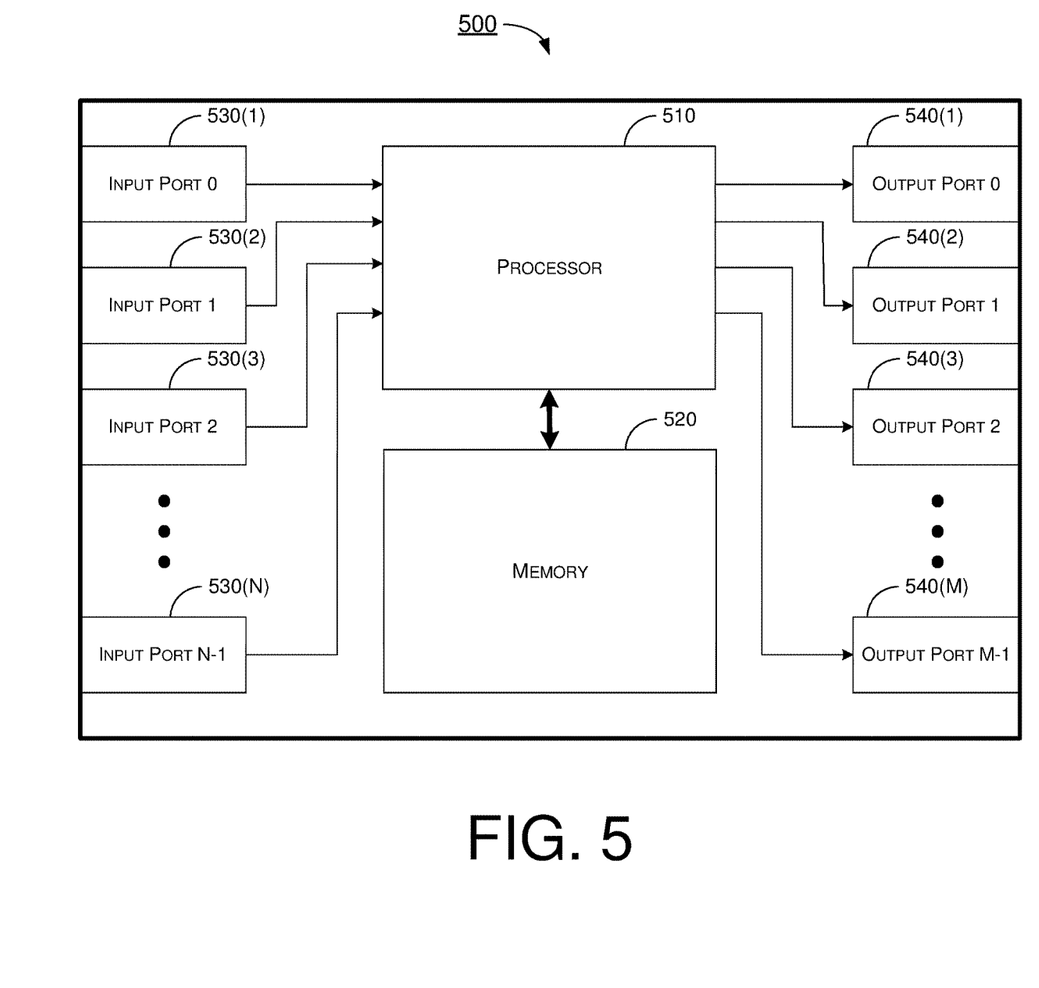
FIG. 5 is a diagram of an example apparatus configured to implement efficient MAC address storage in accordance with implementations of the present disclosure.

FIG. 5 illustrates an example apparatus 500 in accordance with an implementation of the present disclosure. Apparatus 500 may be configured to implement scenarios 100, 200, 300 and 400 described above as well as processes 600 and 700 described below. Apparatus 500 may be implemented in the form of one single integrated-circuit (IC) chip, multiple IC chips or a chipset, and such chip(s) may be employed in a networking device such as, for example and not limited to, a switch, router or gateway. Alternatively, apparatus 500 may be implemented in the form of a communication device or a network node such as, for example and not limited to, a switch, router or gateway. For instance, apparatus 500 may be a packet switch. Apparatus 500 may include at least those components shown in FIG. 5 as well as one or more other components that are not necessary relevant to the scope of the present disclosure. Therefore, to avoid obscuring the concept intended to be conveyed herein, these other components of apparatus 500 are not shown in FIG. 5.

Referring to FIG. 5, apparatus 500 may include a processor 510, a memory 520, a number of input ports 530(1)-530(N) and a number of output ports 540(1)-540(M), with N and M being positive integers greater than or equal to 1. Each of processor 510, memory 520, input ports 530(1)-530(N) and output ports 540(1)-540(M) may be implemented in hardware form including one or more transistors, one or more diodes, one or more thyristors, one or more capacitors, one or more resistors, one or more inductors, one or more memristors, or any combination thereof.

Processor 510 may be communicatively coupled to each of memory 520, input ports 530(1)-530(N) and output ports 540(1)-540(M) to access information, store information, perform operations on data packets and/or control operations thereof. Each of input ports 530(1)-530(N) may be configured to receive incoming data packets, and each of output ports 540(1)-540(M) may be configured to transmit outgoing data packets.

Although memory 520 is shown in FIG. 5 as one single memory component, in various implementations memory 520 may include one or multiple memory components. In some implementations, memory 520 may include a RAM such as SRAM. In some implementations, memory 520 may include a data SRAM and a search SRAM. Memory 520 may be configured to store the incoming data packets as well as the outgoing data packets. Additionally, memory 520 may also store mapping tables, next-hop tables and adjacency tables in accordance with the present disclosure.

For illustrative purpose without limiting the scope of the present disclosure, a description of example operations of processor 510, performed with the support of memory 520, input ports 530(1)-530(N) and output ports 540(1)-540(M), is provided below.

In various implementations in accordance with the present disclosure, processor 510 may determine, based on a plurality of addresses for which the incoming data packets are destined, at least one common property each having a respective value commonly shared by the plurality of addresses associated with one or more virtual machines executed on a computing apparatus. Each address of the plurality of addresses may be different from one another. Processor 510 may generate at least one first field each containing the respective value of a corresponding property of the at least one common property. Processor 510 may also generate at least one second field each containing a respective value distinguishably identifying each virtual machine of the one or more virtual machines. Processor 510 may store the at least one first field and the at least one second field as an address entry representative of the plurality of addresses associated with the one or more virtual machines.

In some implementations, the address entry may require a first amount of memory space for storage, and a second amount of memory space required to store the plurality of addresses associated with the one or more virtual machines may be greater than the first amount of memory space.

In some implementations, the at least one first field may include a first field that includes a first number of bits indicative of an OUI of each application of the one or more applications. The at least one second field may include one or more second fields each of which corresponding to a respective application of the one or more applications. Each second field of the one or more second fields may include an index pointing to the first field and a second number of least significant bits distinguishably identifying the respective application. The first number may be greater than the second number.

Alternatively or additionally, the at least one first field may include a first field that includes a port identification and a first number of most significant bits of an address that are commonly shared by the one or more applications. The at least one second field may include one or more second fields each of which corresponding to a respective application of the one or more applications. Each second field of the one or more second fields may include a destination identification, a second number of least significant bits distinguishably identifying the respective application, and an index pointing to the first field. The first number may be greater than the second number.

Alternatively or additionally, the at least one first field may include a first field that includes a port identification and a first number of most significant bits of an address that are commonly shared by the one or more applications. The at least one second field may include a second number of bits each of which indicating a validity of a respective address of a quantity of the second number of addresses corresponding to the one or more applications. The first number may be greater than the second number.

In some implementations, the plurality of addresses comprise a plurality of MAC addresses associated with the one or more virtual machines.

Figure 6:
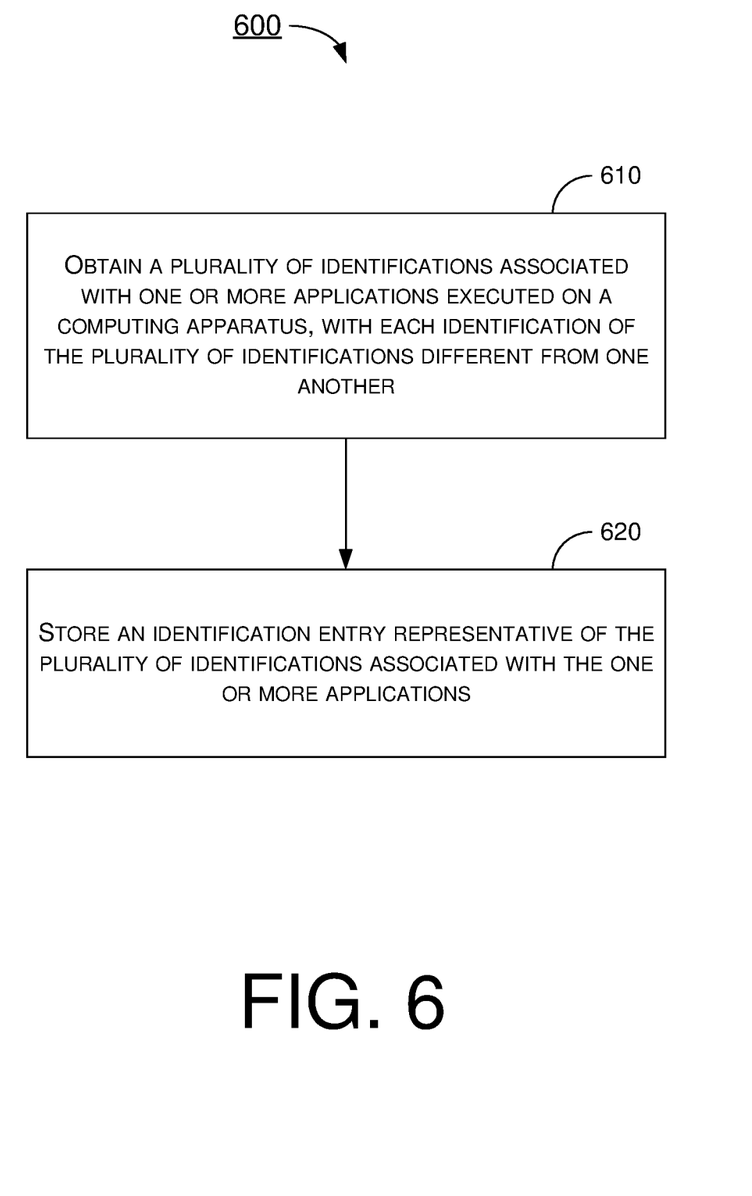
FIG. 6 is a diagram of an example process in accordance with an implementation of the present disclosure.

FIG. 6 illustrates an example process 600 in accordance with an implementation of the present disclosure. Process 600 may include one or more operations, actions, or functions as represented by one or more of blocks 610 and 620. Although illustrated as discrete blocks, various blocks of process 600 may be divided into additional blocks, combined into fewer blocks, or eliminated, depending on the desired implementation. The blocks of process 600 may be performed in the order shown in FIG. 6 or in any other order, depending on the desired implementation. Process 600 may be implemented by apparatus 500. Solely for illustrative purpose and without limiting the scope of the present disclosure, process 600 is described below in the context of process 600 being performed by apparatus 500. Process 600 may begin at 610.

At 610, process 600 may involve processor 510 of apparatus 500 obtaining a plurality of identifications associated with one or more applications executed on apparatus 500. Each identification of the plurality of identifications may be different from one another. The plurality of identifications may include a plurality of MAC addresses associated with the one or more applications. The one or more applications may include one or more virtual machines. Process 600 may proceed from 610 to 620.

At 620, process 600 may involve processor 510 of apparatus 500 storing an identification entry representative of the plurality of identifications associated with the one or more applications.

In some implementations, the identification entry may require a first amount of memory space for storage, and a second amount of memory space required to store the plurality of identifications associated with the one or more applications may be greater than the first amount of memory space.

In some implementations, in storing the identification entry representative of the plurality of identifications associated with the one or more applications, process 600 may involve processor 510 performing a number of operations. For instance, process 600 may involve processor 510 determining at least one common property each having a respective value commonly shared by the plurality of identifications. Process 600 may also involve processor 510 generating at least one first field each containing the respective value of a corresponding property of the at least one common property. Process 600 may additionally involve processor 510 generating at least one second field each containing a respective value distinguishably identifying each application of the one or more applications. Process 600 may further involve processor 510 storing the at least one first field and the at least one second field as the identification entry representative of the plurality of identifications associated with the one or more applications.

In some implementations, the at least one first field may include a first field that includes a first number of bits indicative of an OUI of each application of the one or more applications. The at least one second field may include one or more second fields each of which corresponding to a respective application of the one or more applications. Each second field of the one or more second fields may include an index pointing to the first field and a second number of least significant bits distinguishably identifying the respective application. The first number may be greater than the second number.

Alternatively or additionally, the at least one first field may include a first field that includes a port identification and a first number of most significant bits of an address that are commonly shared by the one or more applications. The at least one second field may include one or more second fields each of which corresponding to a respective application of the one or more applications. Each second field of the one or more second fields may include a destination identification, a second number of least significant bits distinguishably identifying the respective application, and an index pointing to the first field. The first number may be greater than the second number.

Alternatively or additionally, the at least one first field may include a first field that includes a port identification and a first number of most significant bits of an address that are commonly shared by the one or more applications. The at least one second field may include a second number of bits each of which indicating a validity of a respective address of a quantity of the second number of addresses corresponding to the one or more applications. The first number may be greater than the second number.

Figure 7:
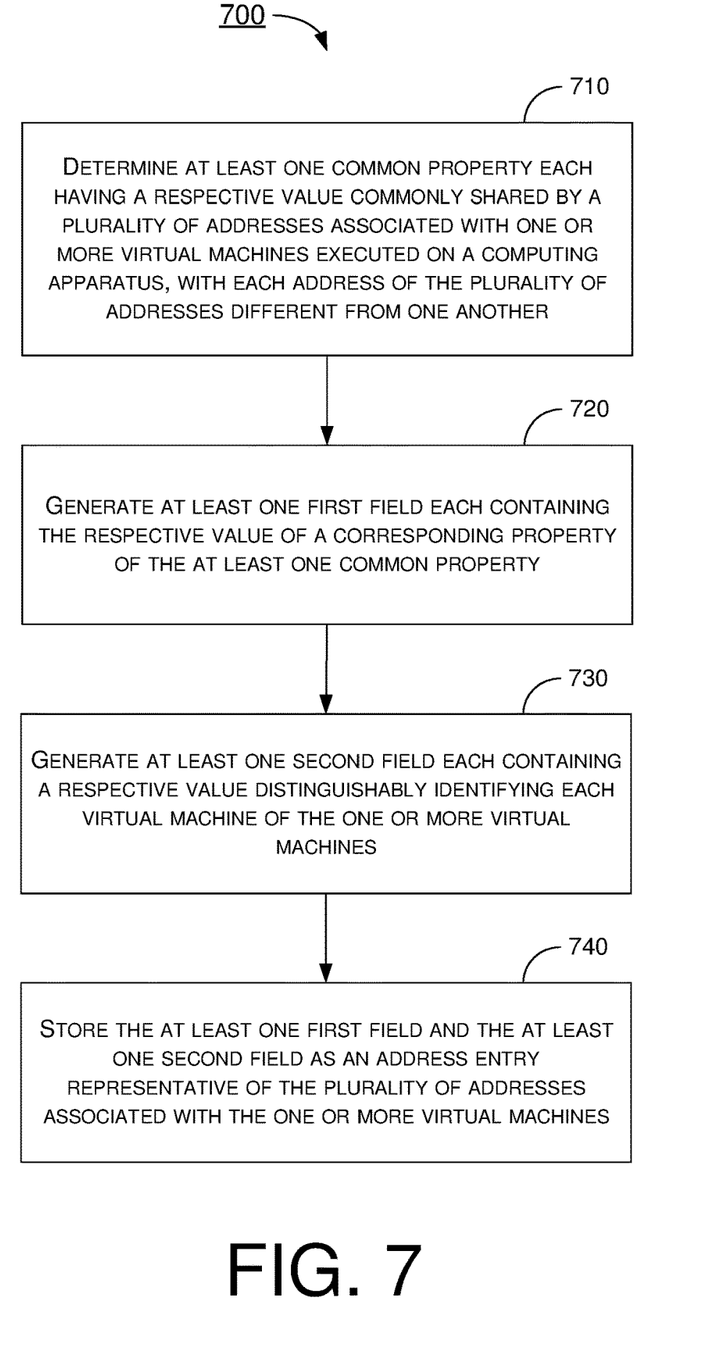
FIG. 7 is a diagram of an example process in accordance with an implementation of the present disclosure.

FIG. 7 illustrates an example process 700 in accordance with an implementation of the present disclosure. Process 700 may include one or more operations, actions, or functions as represented by one or more of blocks 710, 720, 730 and 740. Although illustrated as discrete blocks, various blocks of process 700 may be divided into additional blocks, combined into fewer blocks, or eliminated, depending on the desired implementation. The blocks of process 700 may be performed in the order shown in FIG. 7 or in any other order, depending on the desired implementation. Process 700 may be implemented by apparatus 500. Solely for illustrative purpose and without limiting the scope of the present disclosure, process 700 is described below in the context of process 700 being performed by apparatus 500. Process 700 may begin at 710.

At 710, process 700 may involve processor 510 of apparatus 500 determining at least one common property each having a respective value commonly shared by a plurality of addresses associated with one or more virtual machines executed on a computing apparatus. Each address of the plurality of addresses may be different from one another. Process 700 may proceed from 710 to 720.

At 720, process 700 may involve processor 510 of apparatus 500 generating at least one first field each containing the respective value of a corresponding property of the at least one common property. Process 700 may proceed from 720 to 730.

At 730, process 700 may involve processor 510 of apparatus 500 generating at least one second field each containing a respective value distinguishably identifying each virtual machine of the one or more virtual machines. Process 700 may proceed from 730 to 740.

At 740, process 700 may involve processor 510 of apparatus 500 storing the at least one first field and the at least one second field as an address entry representative of the plurality of addresses associated with the one or more virtual machines.

In some implementations, the address entry may require a first amount of memory space for storage, and a second amount of memory space required to store the plurality of addresses associated with the one or more virtual machines may be greater than the first amount of memory space.

In some implementations, the at least one first field may include a first field that includes a first number of bits indicative of an OUI of each virtual machine of the one or more virtual machines. The at least one second field may include one or more second fields each of which corresponding to a respective virtual machine of the one or more virtual machines. Each second field of the one or more second fields may include an index pointing to the first field and a second number of least significant bits distinguishably identifying the respective virtual machine. The first number may be greater than the second number.

Alternatively or additionally, the at least one first field may include a first field that includes a port address and a first number of most significant bits of an address that are commonly shared by the one or more virtual machines. The at least one second field may include one or more second fields each of which corresponding to a respective virtual machine of the one or more virtual machines. Each second field of the one or more second fields may include a destination address, a second number of least significant bits distinguishably identifying the respective virtual machine, and an index pointing to the first field. The first number may be greater than the second number.

Alternatively or additionally, the at least one first field may include a first field that includes a port address and a first number of most significant bits of an address that are commonly shared by the one or more virtual machines. The at least one second field may include a second number of bits each of which indicating a validity of a respective address of a quantity of the second number of addresses corresponding to the one or more virtual machines. The first number may be greater than the second number.

In some implementations, the plurality of addresses may include a plurality of MAC addresses associated with the one or more virtual machines.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    determining at least one common property each having a respective value commonly shared by a plurality of addresses associated with one or more virtual machines executed on a computing apparatus, each address of the plurality of addresses being different from one another;
    generating at least one first field each containing the respective value of a corresponding property of the at least one common property;
    generating at least one second field each containing a respective value distinguishably identifying each virtual machine of the one or more virtual machines;
    storing, in a memory, the at least one first field and the at least one second field as an address entry representative of the plurality of addresses associated with the one or more virtual machines; and
    utilizing a mapping table, which stores an organizationally unique identifier (OUI) of each virtual machine of the one or more virtual machines, along with the memory such that an amount of memory required to store an address associated with a respective one of the one or more virtual machines is reduced, wherein each address of the plurality of addresses includes an index pointing to a corresponding entry in the mapping table, wherein the at least one first field comprises a first field that includes a first number of bits indicative of the OUI of each virtual machine of the one or more virtual machines, wherein the at least one second field comprises one or more second fields each of which corresponding to a respective virtual machine of the one or more virtual machines, wherein each second field of the one or more second fields comprises an index pointing to the first field and a second number of least significant bits distinguishably identifying the respective virtual machine, and wherein the first number is greater than the second number.

2. The method of claim 1, wherein the address entry requires a first amount of memory space for storage, and wherein a second amount of memory space required to store the plurality of addresses associated with the one or more virtual machines is greater than the first amount of memory space.

3. The method of claim 1, wherein the at least one first field comprises a first field that includes a port address and a first number of most significant bits of an address that are commonly shared by the one or more virtual machines, wherein the at least one second field comprises one or more second fields each of which corresponding to a respective virtual machine of the one or more virtual machines, wherein each second field of the one or more second fields comprises a destination address, a second number of least significant bits distinguishably identifying the respective virtual machine, and an index pointing to the first field, and wherein the first number is greater than the second number.

4. The method of claim 1, wherein the at least one first field comprises a first field that includes a port address and a first number of most significant bits of an address that are commonly shared by the one or more virtual machines, wherein the at least one second field comprises a second number of bits each of which indicating a validity of a respective address of a quantity of the second number of addresses corresponding to the one or more virtual machines, and wherein the first number is greater than the second number.

5. The method of claim 1, wherein the plurality of addresses comprise a plurality of media access control (MAC) addresses associated with the one or more virtual machines.

6. An apparatus, comprising:
one or more input ports configured to receive incoming data packets;
one or more output ports configured to transmit outgoing data packets;
a memory; and
a processor communicatively coupled to the one or more input ports, the one or more output ports and the memory, the processor configured to perform operations comprising:
receiving the incoming data packets the one or more input ports;
determining, based on a plurality of addresses for which the incoming data packets are destined, at least one common property each having a respective value commonly shared by the plurality of addresses associated with one or more virtual machines executed on a computing apparatus, each address of the plurality of addresses being different from one another;
generating at least one first field each containing the respective value of a corresponding property of the at least one common property;
generating at least one second field each containing a respective value distinguishably identifying each virtual machine of the one or more virtual machines;
storing, in the memory, the at least one first field and the at least one second field as an address entry representative of the plurality of addresses associated with the one or more virtual machines; and
utilizing a mapping table, which stores an organizationally unique identifier (OUI) of each virtual machine of the one or more virtual machines, along with the memory such that an amount of memory required to store an address associated with a respective one of the one or more virtual machines is reduced,
wherein each address of the plurality of addresses includes an index pointing to a corresponding entry in the mapping table,
wherein the at least one first field comprises a first field that includes a port address and a first number of most significant bits of an address that are commonly shared by the one or more virtual machines,
wherein the at least one second field comprises a second number of bits each of which indicating a validity of a respective address of a quantity of the second number of addresses corresponding to the one or more virtual machines, and
wherein the first number is greater than the second number.

7. The apparatus of claim 6, wherein the address entry requires a first amount of memory space for storage, and wherein a second amount of memory space required to store the plurality of addresses associated with the one or more virtual machines is greater than the first amount of memory space.

8. The apparatus of claim 6, wherein the at least one first field comprises a first field that includes a first number of bits indicative of the OUI of each virtual machine of the one or more virtual machines, wherein the at least one second field comprises one or more second fields each of which corresponding to a respective virtual machine of the one or more virtual machines, wherein each second field of the one or more second fields comprises an index pointing to the first field and a second number of least significant bits distinguishably identifying the respective virtual machine, and wherein the first number is greater than the second number.

9. The apparatus of claim 6, wherein the at least one first field comprises a first field that includes a port address and a first number of most significant bits of an address that are commonly shared by the one or more virtual machines, wherein the at least one second field comprises one or more second fields each of which corresponding to a respective virtual machine of the one or more virtual machines, wherein each second field of the one or more second fields comprises a destination address, a second number of least significant bits distinguishably identifying the respective virtual machine, and an index pointing to the first field, and wherein the first number is greater than the second number.

10. The apparatus of claim 6, wherein the plurality of addresses comprise a plurality of media access control (MAC) addresses associated with the one or more virtual machines.

* * * * *